United States Patent
Khudyakov et al.

(10) Patent No.: US 11,404,030 B2
(45) Date of Patent: *Aug. 2, 2022

(54) DYNAMIC VIEW MANAGEMENT IN VISUALIZATIONS

(71) Applicant: Tableau Software, LLC, Seattle, WA (US)

(72) Inventors: Vasily Khudyakov, Kenmore, WA (US); Jewel Loree, Seattle, WA (US); Felipe Luis Naranjo, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,597

(22) Filed: Mar. 29, 2021

(65) Prior Publication Data

US 2021/0217383 A1 Jul. 15, 2021

Related U.S. Application Data

(63) Continuation of application No. 16/658,573, filed on Oct. 21, 2019, now Pat. No. 10,964,293.

(Continued)

(51) Int. Cl.
*G09G 5/14* (2006.01)
*G06F 21/84* (2013.01)
(Continued)

(52) U.S. Cl.
CPC ............ *G09G 5/14* (2013.01); *G06F 16/904* (2019.01); *G06F 16/9038* (2019.01);
(Continued)

(58) Field of Classification Search
CPC .......... G09G 5/14; G09G 3/2003; G09G 5/06; G09G 2354/00; G09G 2360/08;
(Continued)

(56) References Cited

U.S. PATENT DOCUMENTS

2004/0164983 A1   8/2004  Khozai
2008/0049030 A1   2/2008  Keslin
(Continued)

OTHER PUBLICATIONS

Office Communication for U.S. Appl. No. 16/658,573 dated Sep. 16, 2020, pp. 1-8.
(Continued)

*Primary Examiner* — Jeffery A Brier
(74) *Attorney, Agent, or Firm* — John W. Branch; Branch Partners PLLC

(57) ABSTRACT

Embodiments are directed to managing display hardware for visualizing data a network computer. A modeling engine may provide a data model includes a plurality of data objects and a display model that includes a plurality of display objects that may be based on the plurality of data objects. Action objects may be associated with display objects in the display model. A display engine may display the display model on a hardware display based on context information that includes performance characteristics of the hardware display. In response to a trigger events, action objects may be displayed on the hardware display based on the context information. In response to detecting input signals associated with the action objects the display model may be modified based on the action objects. The modified display model may be displayed on the hardware display based on the context information.

20 Claims, 10 Drawing Sheets

Related U.S. Application Data

(60) Provisional application No. 62/749,027, filed on Oct. 22, 2018.

(51) Int. Cl.
  G09G 5/06 (2006.01)
  G06F 16/9038 (2019.01)
  G09G 3/20 (2006.01)
  G06F 16/904 (2019.01)

(52) U.S. Cl.
  CPC ............ G06F 21/84 (2013.01); G09G 3/2003 (2013.01); G09G 5/06 (2013.01)

(58) Field of Classification Search
  CPC .... G06F 16/9038; G06F 16/904; G06F 21/84; G06F 3/14; G06F 40/103; G06T 11/60
  See application file for complete search history.

(56) References Cited

U.S. PATENT DOCUMENTS

| | | |
|---|---|---|
| 2008/0301540 A1 | 12/2008 | Sava et al. |
| 2013/0024453 A1 | 1/2013 | Duke |
| 2017/0076653 A1 | 3/2017 | Bell et al. |
| 2017/0132814 A1 | 5/2017 | Liu et al. |
| 2017/0154088 A1 | 6/2017 | Sherman |
| 2017/0154089 A1 | 6/2017 | Sherman |
| 2018/0336841 A1 | 11/2018 | Rath et al. |

OTHER PUBLICATIONS

Office Communication for U.S. Appl. No. 16/658,573 dated Nov. 27, 2020, pp. 1-8.

Office Communication for U.S. Appl. No. 16/812,170 dated Dec. 21, 2020, pp. 1-7.

Office Communication for U.S. Appl. No. 16/812,170 dated Mar. 8, 2021, pp. 1-7.

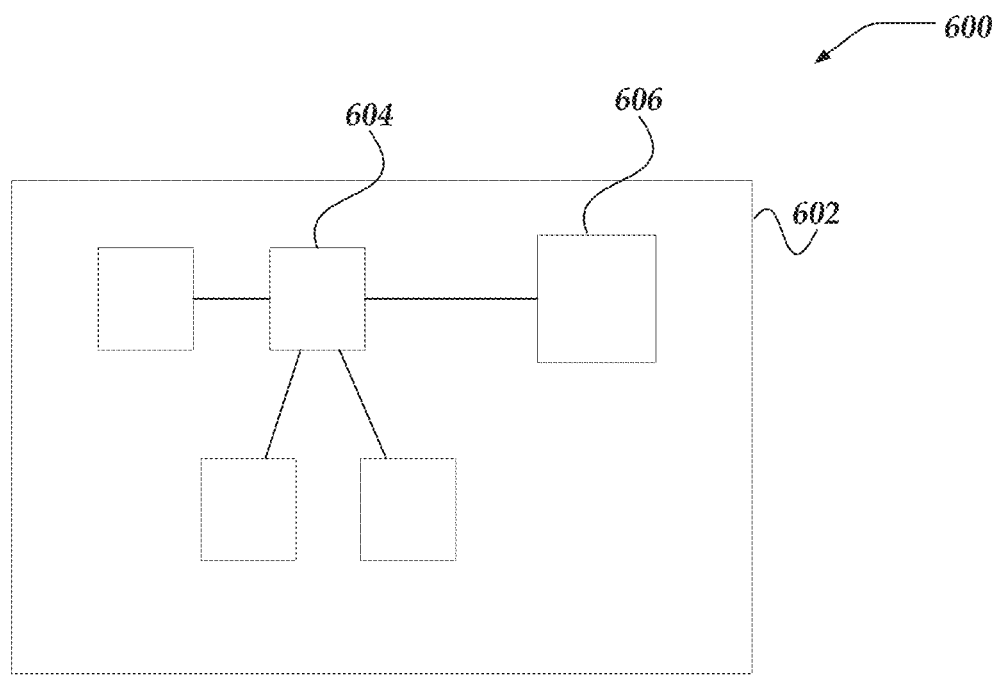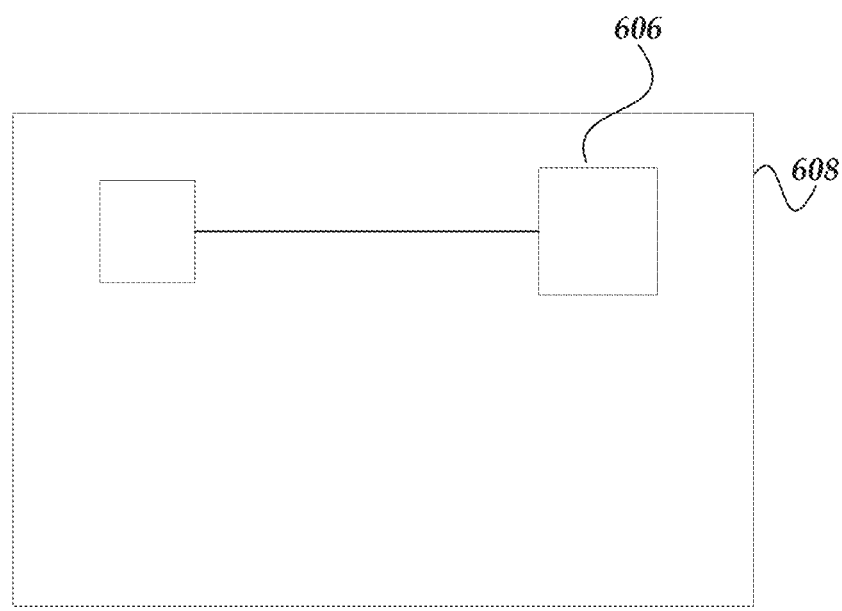
Fig. 6

DYNAMIC VIEW MANAGEMENT IN VISUALIZATIONS

CROSS-REFERENCE TO RELATED APPLICATION

This Utility Patent Application is a Continuation of U.S. patent application Ser. No. 16/658,573 filed on Oct. 21, 2019, now U.S. Pat. No. 10,964,293 issued on Mar. 30, 2021, which is based on previously filed U.S. Provisional Patent Application No. 62/749,027 filed on Oct. 22, 2018, the benefit of the filing dates of which are hereby claimed under 35 U.S.C. § 119(e) and § 120 and the contents of which are each further incorporated in entirety by reference.

TECHNICAL FIELD

The present invention relates generally to data visualization, and more particularly, but not exclusively, to managing the display of objects included in the data visualization.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data enables organizations to improve their understanding of critical business operations and help monitor key performance indicators. However, generating effective visualizations may require users to have a deep understanding of the data as well the skills to map the data to a visualization using a visualization authoring tool. Further, users creating or author visualizations may be employing processors or display hardware that is significantly different that one or more targeted users. Also, in some cases, visualization authors may have difficulty authoring a single visualization that may be suitable for two or more user or two or more hardware displays. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 6 illustrates a logical schematic of a system that include display models used for dynamic view management in visualizations in accordance with one or more of the various embodiments;

DETAILED DESCRIPTION OF VARIOUS EMBODIMENTS

Figure 1:
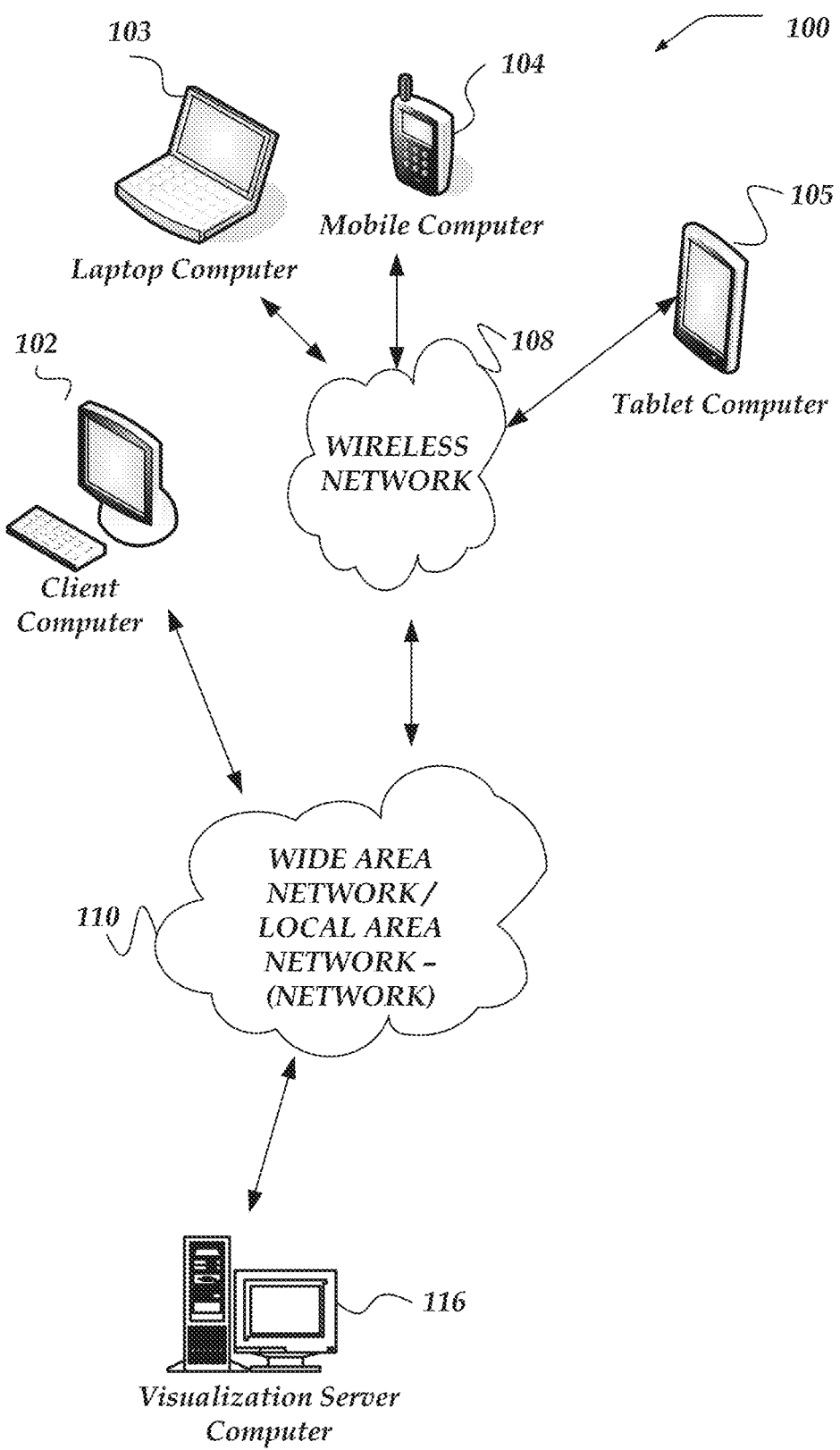
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term "data model" refers to one or more data structures that represent one or more entities associated with data collected or maintained by an organization. Data models are typically arranged to model various operations or activities associated with an organization. In some cases, data models are arranged to provide or facilitate various data-focused actions, such as, efficient storage, queries, indexing, search, updates, or the like. Generally, a data model may be arranged to provide features related to data manipulation or data management rather than providing an easy to understand presentation or visualizations of the data.

As used herein the term "data object" refers to one or more data structures that comprise data models. In some cases, data objects may be considered portions of the data model. Data objects may represent individual instances of items or entire classes or kinds of items.

As user herein the "display model" refers to one or more data structures that represent one or more representations of a data model that may be suitable for use in a visualization that is displayed on one or more hardware displays. Display models may define styling or user interface features that may be made available to non-authoring user.

As used herein the term "display object" refers to one or more data structures that comprise display models. In some cases, display objects may be considered portions of the display model. Display objects may represent individual instances of items or entire classes or kinds of items that may be displayed in a visualization. In some embodiments, display objects may be considered or referred to as views because they provide a view of some portion of the data model As used herein the term "action object" refers to one or more data structures that encapsulate one or more actions or behaviors that may be associated with portions of a display model. In some cases, action objects may be associated with one or more input signals, one or more trigger events, one or more actions, or the like. Visualization authors may define one or more action objects that may be associated with one or more display objects. Action objects may be associated with one or more user interface controls. Visualization authors may include one or more action objects with an otherwise static or fixed display model. Action objects enable visualization authors to inject interactive behaviors into a visualization that is otherwise fixed. Action objects enable interactive or rule based behaviors to be dynamically accessed or applied in a visualization by non-authoring users. Actions associated with the action objects include one or more constraints that limit how the type or range of modification a non-author can make to a display model. Actions associated with action objects may include, showing/hiding display objects, positioning display objects in visualization, toggling one or more visualization styles or rendering features associated with a display object, or the like. In some embodiments, action objects may be associated with rule-based actions that interpret various input signals or display characteristics for determining a modification to display model.

As used herein the term "trigger event" refers to one or more events that may cause an action object to become active or otherwise available for use in an visualization. For example, the occurrence of a trigger event may cause a display engine to display a button or other user interface control that enables a non-authoring user to employ the associated action. Trigger events may be defined using configuration information, conditions, rules, or the like, and then associated with one or more action objects. In some cases, trigger events may be arranged to interpret inputs provided from various sources, such as, the display hardware, user input, external services, timers, alarms, or the like. In some embodiments, defining trigger events or associating trigger events with action objects may be performed by a visualization author rather than a non-authoring user.

As used herein the term "context information" refers to one or more data structures that include one or more values that represent various performance characteristics of computers or hardware displays employed to display visualizations based on display models. In some embodiments, context information may include values associated with characteristics or metrics, such as, display resolution, display orientation, display color range, display size, available fonts/font-sizes, processor information, processor utilization patterns/history, screen zoom settings, accessibility options, memory utilization, network bandwidth, or the like. In some embodiments, display engines may employ context information when displaying display models or performing action object actions.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing display hardware for visualization data using a network computer. In one or more of the various embodiments, a modeling engine may be instantiated to perform various actions as described below.

In one or more of the various embodiments, the modeling engine may be arranged to provide a data model and a display model such that the data model includes a plurality of data objects and the display model includes a plurality of display objects that may be based on the plurality of data objects.

In one or more of the various embodiments, the modeling engine may be arranged to associate at least one action object with at least one of the display objects in the plurality of display objects based on the display model such that each associated action object may be associated with one or more trigger events, one or more signals, one or more constraints, or the like.

In one or more of the various embodiments, a display engine may be instantiated to perform various actions as described below.

In one or more of the various embodiments, the display engine may be arranged to display the display model on a hardware display based on context information that includes one or more performance characteristics of the hardware display.

In response to an occurrence of one or more trigger events, in one or more of the various embodiments, the display engine may be arranged to display one or more action objects on the hardware display based on the context information.

In response to detecting the one or more signals associated with the one or more action objects, in one or more of the various embodiments, the display engine may be arranged to perform further actions, including: modifying the display model based on the one or more action objects, the one or more constraints, or the like; and displaying the modified display model on the hardware display based on the context information such that the performance of the hardware display may be improved by employing the context information to display the modified display model.

In one or more of the various embodiments, modifying the display model may include includes concealing one or more display objects based on the one or more action objects such that the concealed one or more display objects are omitted from display on the hardware display.

Also, in one or more of the various embodiments, modifying the display model may include includes: determining one or more display objects that are associated with the one or more action objects such that the one or more determined display objects have one or more static display characteristics, and such that the one or more static display characteristics include one or more of display geometry, visibility, text content, labels, size, or the like; and modifying the one or more determined display objects based on the one or more action objects such that the modifications to the determined display objects may include modifying one or more of the one or more static characteristics.

In one or more of the various embodiments, the modeling engine may be arranged to provide one or more dependent action objects that may be associated with the one or more action objects. Accordingly, in some embodiments, in response to detecting the at least one signal associated with the one or more action objects, the one or more display objects associated with the one or more dependent action objects may be modified.

In one or more of the various embodiments, providing the display model may include providing one or more container display objects that may include one or more display objects of the plurality of display objects. And, associating one or more other action objects with the one or more container objects such that an activation of the one or more other action objects may modify one or more characteristics of the one or more container display objects and the one or more included display objects.

In one or more of the various embodiments, modifying the display model based on the one or more action objects and the context information may include determining one or more modifications based on one or more features or characteristics of the hardware display such that the one or more modifications include one or more of reducing a number of displayed pixels to support a different display resolution, reducing a number of colors in a display palette, modifying one or more display characteristics of one or more user interface controls that are associated with the one or more actions, or the like.

In one or more of the various embodiments, providing the one or more action objects may include: associating the one or more action objects with two or more display objects; and in response to detecting the at least one signal associated with the one or more action objects, modifying each of the two or more display objects based on the one or more action objects.

In one or more of the various embodiments, providing the one or more action objects may include associating two or more action objects with a same display object; and in response to detecting a signal that is associated with at least one of the two or more action objects, modifying the same display object based on the at least one action object.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, visualization server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language.

In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, document validation server computer 116, document management server computer 118, or other computers.

Client computers 102-105 may further be configured to include a client application that enables an end-user to log into an end-user account that may be managed by another computer, such as document validation server computer 116, document management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by document validation server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, document validation server computer 116, document management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116 is described in more detail below in conjunction with FIG. 3. Although FIG. 1 illustrates visualization server computer 116 as a single computer, the innovations or embodiments are not so limited. For example, one or more functions of visualization server computer 116, or the like, may be distributed across one or more distinct network computers. Moreover, in one or more embodiments, visualization server computer 116 may be implemented using a plurality of network computers. Further, in one or more of the various embodiments, visualization server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
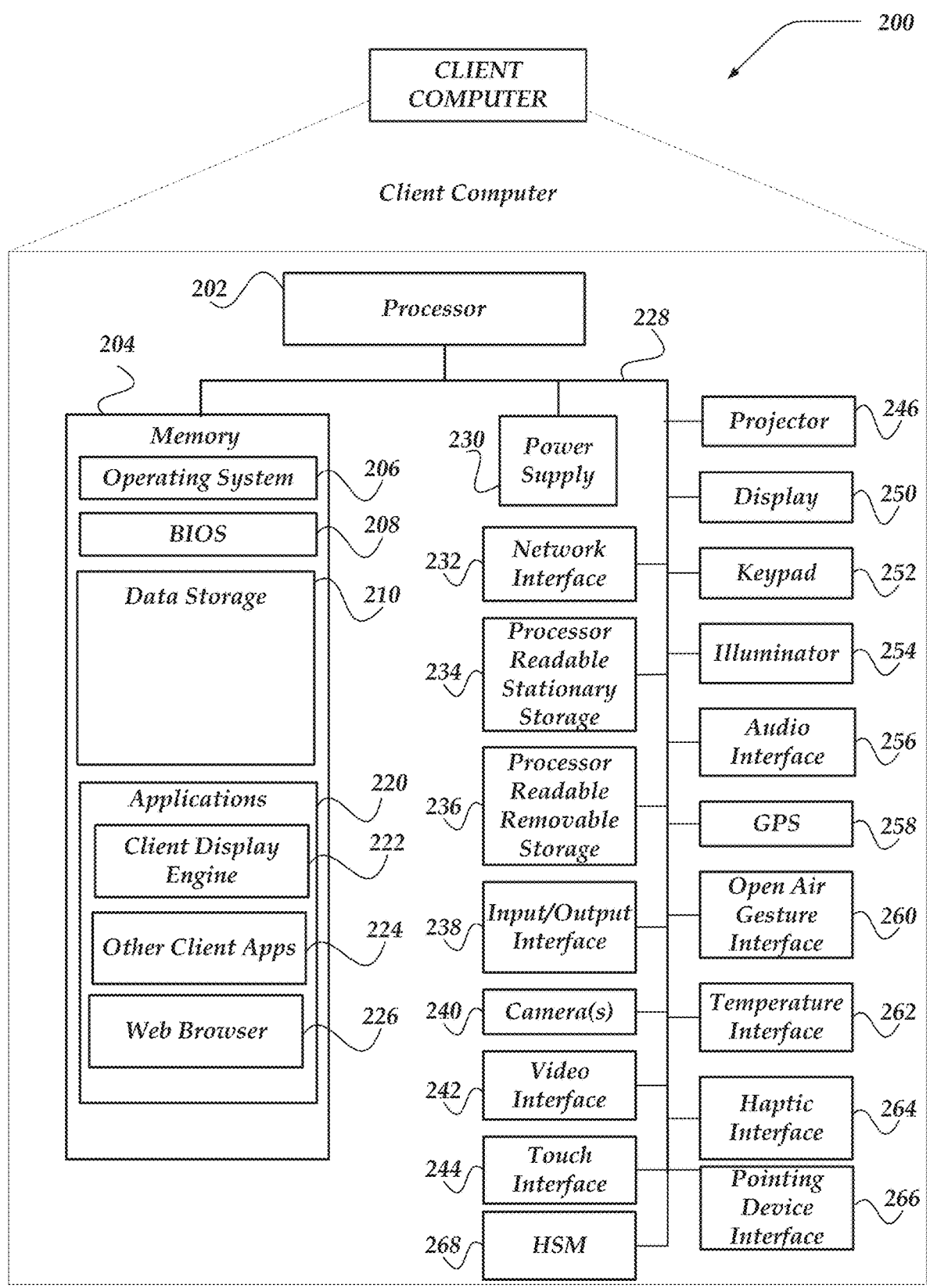
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, client display engine 222, other client apps 224, web browser 226, or the like, may be arranged to employ geo-location information to select one or more localization features, such as, time zones, languages, currencies, calendar formatting, or the like. Localization features may be used in documents, visualizations, display objects, display models, action objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, Android™, or the IOS operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client display engine 222, other client applications 224, web browser 226, or the like. Client computers may be arranged to exchange communications, such as, queries, searches, messages, notification messages, event messages, alerts, performance metrics, log data, API calls, or the like, combination thereof, with visualization server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
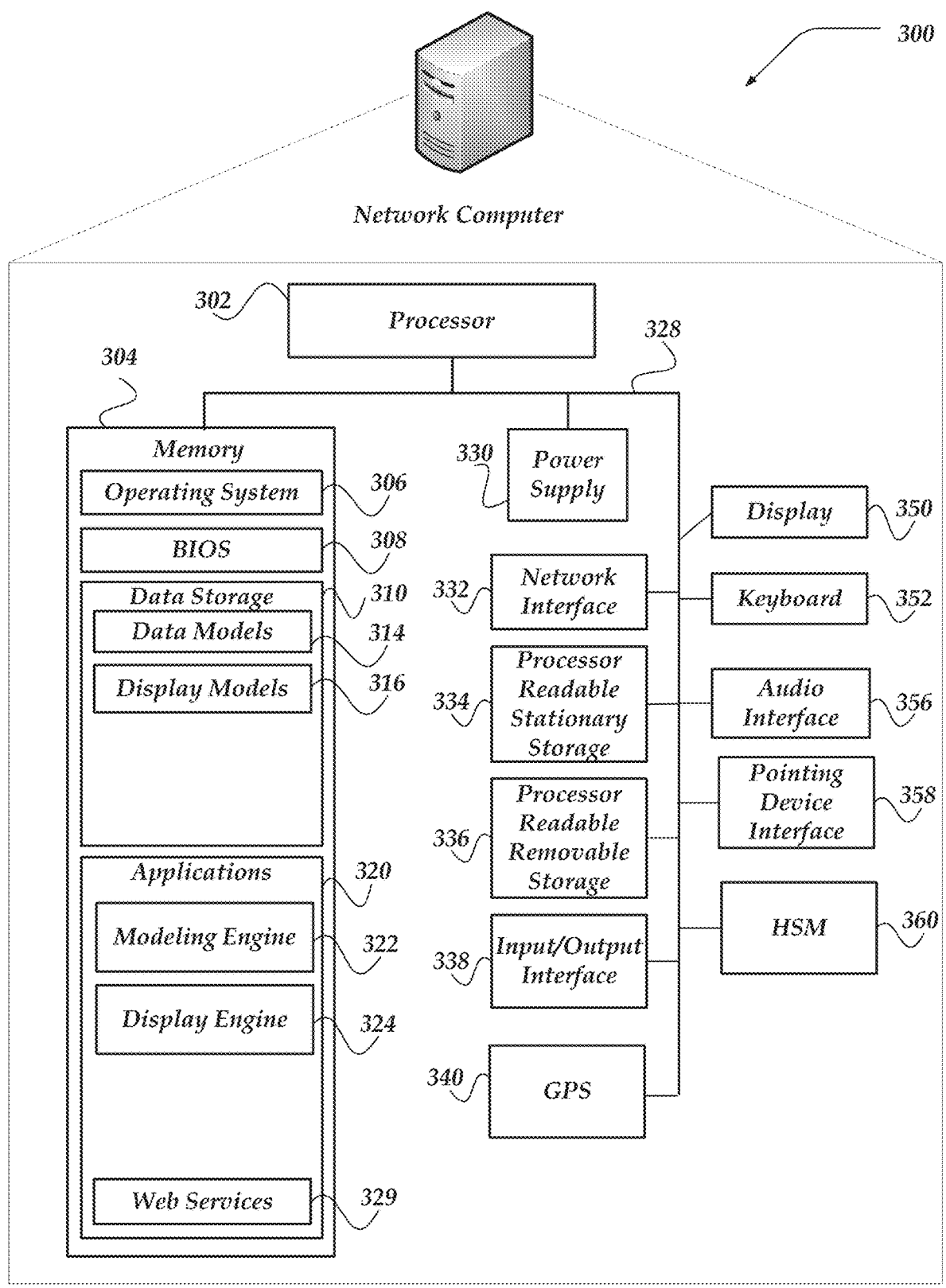
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more visualization server computer 116 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, modeling engine 322, display engine 324, web services 329, or the like, may be arranged to employ geo-location information to select one or more localization features, such as, time zones, languages, currencies, currency formatting, calendar formatting, or the like. Localization features may be used in documents, file systems, user-interfaces, reports, display objects, display models, visualizations as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, display models 316, or the like. Data models 314 may store files, documents, versions, properties, meta-data, data structures, or the like, that represent one or more portions of one or more data models. Display models 316 may store display models.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include modeling engine 322, display engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, modeling engine 322, display engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to modeling engine 322, display engine 324, web services 329, or the like, may be provisioned and de-commissioned automatically.

Also, in one or more of the various embodiments, modeling engine 322, display engine 324, web services 329, or the like, may be located in virtual servers running in a cloud-based computing environment rather than being tied to one or more specific physical network computers.

Further, network computer 300 may also include hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
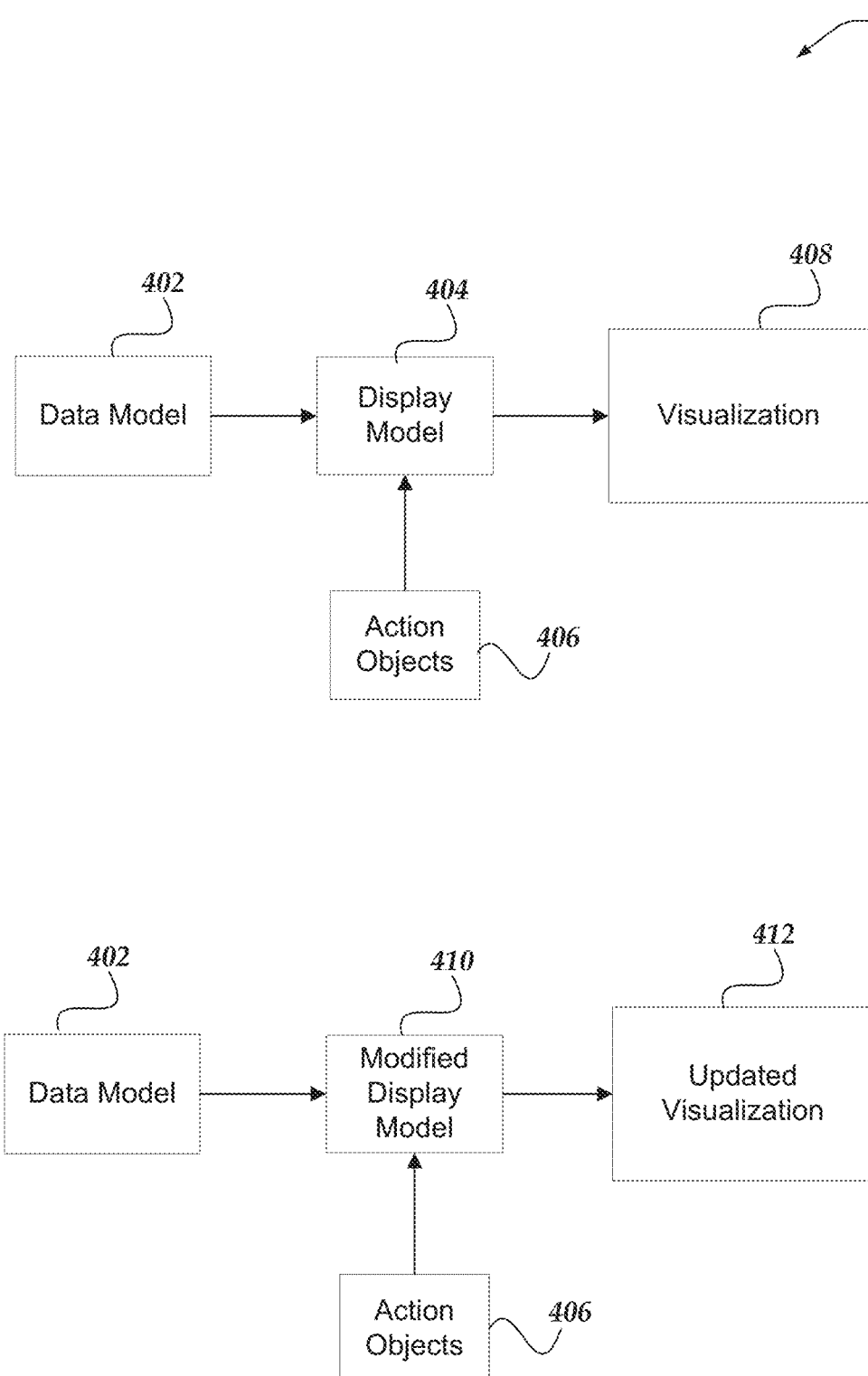
FIG. 4 illustrates a logical architecture of a system for dynamic view management in visualizations in accordance with one or more of the various embodiments.

FIG. 4 illustrates a logical architecture of system 400 for dynamic view management in visualizations in accordance with one or more of the various embodiments. In one or more of the various embodiments, system 400 may include: one or more data models, such as, data model 402, which may be comprised of several data objects; one or more display models, such as, display model 404; one or more visualizations, such as, visualization 408. In one or more of the various embodiments, one or more users may be authorized to generate display models, such as, display model 404 based on data models, such as, data model 402. Generally, the users that are enabled to generate display models may be considered authors of the display model (e.g., authoring users).

In one or more of the various embodiments, other non-authoring users may be enabled to view one or more visualizations, such as, visualization 408, that are generated from a display model for display on a hardware display (not shown).

In one or more of the various embodiments, an authoring user may be enabled to configure or provide one or more action objects, such as, action objects 406 that may be associated with one or more display objects that comprise a display model, such as, display model 404. As described below, each action object may be associated with one or more more display objects.

In one or more of the various embodiments, display models provided by an author for generating visualization may be considered fixed or static with respect to how the author arranges the display model based on the data model. Accordingly, in some embodiments, an authoring user may selectively associate one or more data objects in the data model with one or more display objects in a corresponding display model. In some embodiments, system 400 may include a modeling engine (not shown here) that enables an author to interactively design a display model for visualizing of one or more portions of the data model.

In one or more of the various embodiments, display models may be comprised of one or more display objects. In some embodiments, display objects may represent a visualization or partial visualization of the data associated with one or more data objects. The particular visualization expressed by a display object may be selected based on the composition (e.g., data type, properties, number of items, semantic meaning, or the like) of a given data object. In some embodiments, a data object may be associated with more than one display object, each representing a different visualization of the given data object. Accordingly, display objects may be arranged to represent different common, uncommon, or custom, visualization elements, such as, line plots, surface plots, bar charts, pie charts, tables, text fields, text areas, or the like, that may be included in visualizations to provide improved understanding of data. In some embodiments, visualizations may be targeted for different audiences, such as, customers, stakeholders, internal teams, business intelligence teams, or the like. Accordingly, more than one display models may be generated or associated with the same data model.

In one or more of the various embodiments, data models may include complex data representations that require data analysis or schema analysis to understand. Further, in some embodiments, the raw data or values comprising data objects that make up a data model may include restricted or sensitive information. Accordingly, in some embodiments, authors of display models may be required to have extensive or detailed knowledge of the data models. Likewise, in some embodiments, if the data is restricted or sensitive, authors may require additional vetting, screening, privileges, or monitoring to help ensure the data they are accessing is protected.

Accordingly, in some embodiments, an author may provide display models based on complex or sensitive data for use by other users (e.g., non-authoring users). These display models may be fixed such that they offer pre-defined or limited views or interaction options for a non-authoring user. Thus, in some embodiments, an authoring user may have to predict or anticipate the needs of the user when designing a display model from a data model. In some embodiments, for many well-known reasons it may be difficult to hit the mark. Thus, in some cases, authors may include too much or too little information or interactivity in the display models.

Also, in some embodiments, multiple users, while having individual requirements or access rights, may require similar display models that may be more or less the same except for a few variations or data restrictions. Accordingly, in some cases, absent innovations disclosed herein, an authoring user may be required to generate multiple display models that may be essentially the same except for a few differences.

Also, in some embodiments, users may attempt to use visualizations based on display models on a variety of display hardware having varied or incompatible features (e.g., performance characteristics). Accordingly, in one or more of the various embodiments, absent innovations disclosed herein, an authoring user may be required to provide different display models for different display hardware.

Accordingly, in one or more of the various embodiments, a modeling engine, such as, modeling engine 322 may be arranged to enable an authoring user to provide display models that include features that may be activated in various circumstances. In some embodiments, this may enable the authoring user to provide a secure or fixed display model that is flexible enough to handle more than one target display or target user.

In one or more of the various embodiments, a modeling engine may be arranged to enable one or more action objects, such as, action objects 406 to be associated with one or more display objects that may comprise a display model. In one or more of the various embodiments, action objects are associated with one or more actions, one or more trigger events, one or more signals, one or more constraints, or the like.

Action objects will be described in more detail below, but in general, authoring users may associate one or more action objects to display objects. In some embodiments, action objects may enable additional interactivity or customization to be added to an otherwise fixed display model.

Authoring users may configure action objects to have trigger events, actions, constraints, signals, or the like. Thus, in some embodiments, action objects may be employed to inject additional dynamic interactivity or behaviour into a display model.

In one or more of the various embodiments, action objects may be arranged to become active in a given visualization based on interactions with non-authoring users. Thus, in some embodiments, users may choose whether to employ the provided action objects.

In one or more of the various embodiments, if a non-authoring user triggers or activates an action object, the display engine may be arranged to dynamically modify the display model based on the arrangement or configuration of a given action object as defined by an authoring user that provides the display model.

For example, system 400 may include one or more action objects, such as, action objects 406, that are associated with one or more display objects in display model 404. Accordingly, in one or more of the various embodiments, if one or more action objects are activated and signalled by a non-authoring user, a display engine may be arranged to temporarily modify the display model based on the executed actions associated with the one or more action objects.

In this example, for some embodiments, modified display model 410 represents a display model provided based on modification made by one or more action objects. Accordingly, in some embodiments, updated visualization 412 may be displayed on a hardware display based on modified display model 410.

In some embodiments, action based modifications may include various changes to a display model, such as, show/hiding one or more display objects, moving one or more display objects, modifying display styles (e.g., colors, fonts, font size, or the like), alignment or layout of display objects in the visualization, or the like.

In one or more of the various embodiments, action based modifications may include employing one or more localization services to dynamically determine the geographical location of a client that may be displaying a visualization of a display model. For example, in one or more of the various embodiments, a Global Positioning System (GPS) device, such as, GPS 258 or GPS 340, may be employed to improve one or more users' understanding of the underlying data model or display model by modifying a visual presentation in a display that includes one or more of a database, a user interface, an internal process or the visualization of the display model based on a location of each client computer employed by one or more users such that the modifications in the visualization localization may include time zone, currency, calendar format, language, or the like, combination thereof.

Figure 5:
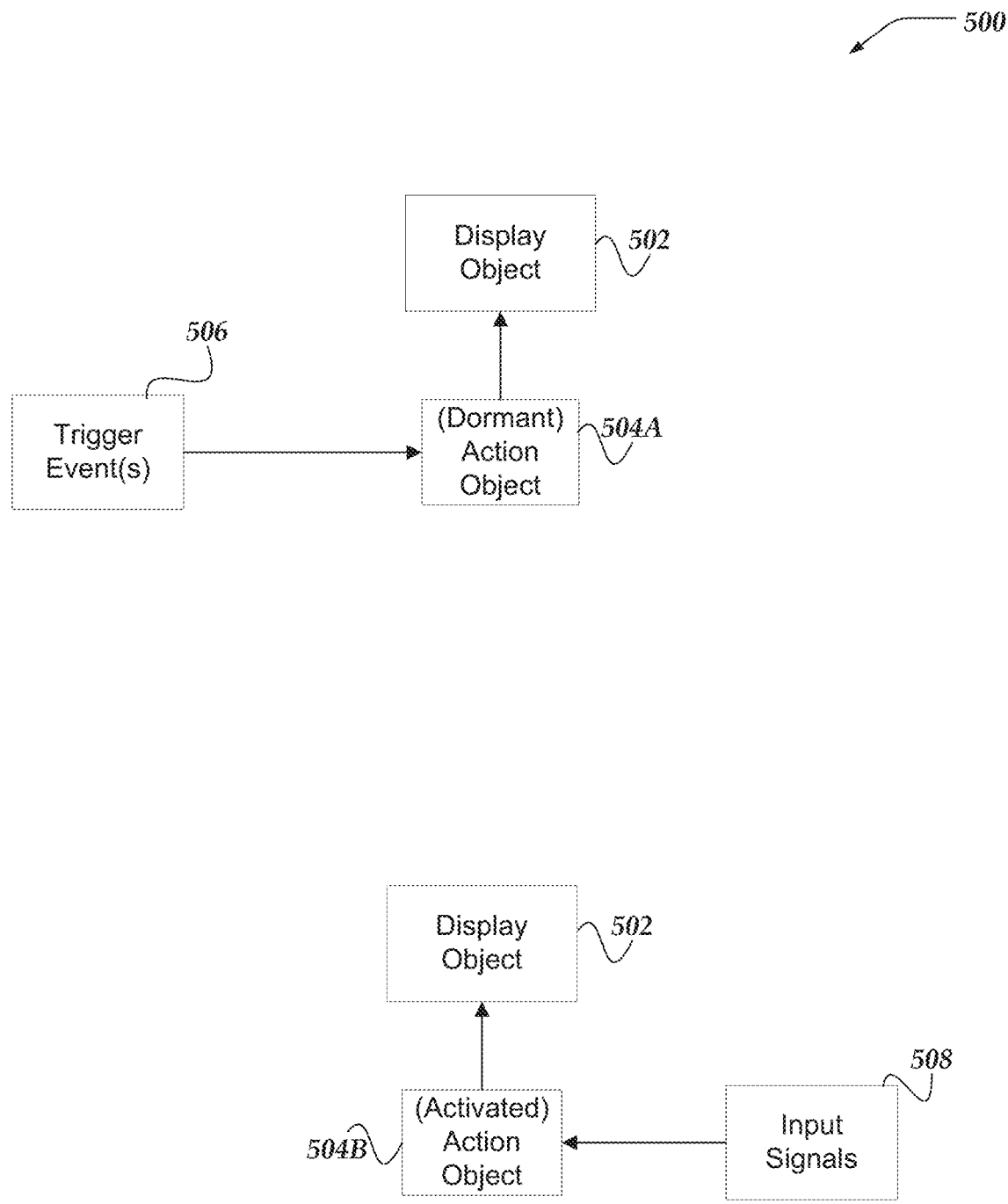
FIG. 5 illustrates a logical schematic of a system for employing action objects in a display model in accordance with one or more of the various embodiments.

FIG. 5 illustrates a logical schematic of system 500 for employing action objects in a display model in accordance with one or more of the various embodiments. In one or more of the various embodiments, one or more display objects, such as, display object 502 may be included in a display model (not shown). In some embodiments, an authoring user may associate one or more action objects, such as, action object 504A, with display objects, such as, display object 502.

In one or more of the various embodiments, action objects may be considered dormant, if they are not activated. In some embodiments, the action objects associated with a display object but not yet activated may be considered dormant. Such action objects may be present but not visible in the visualization. In some embodiments, the modeling engine may be arranged to maintain the association of the dormant action objects with the display objects they may be associated with even though a non-authoring user is does not use them, including situations where the non-authoring user is unaware of them.

In one or more of the various embodiments, action objects may be arranged to be associated with one or more trigger events, such as, trigger events 506. Accordingly, in one or more of the various embodiments, the occurrence of one or more trigger events may activate one or more action objects. In some embodiments, the behavior and visual representation of activated action objects may vary depending on how they are configured. In some embodiments, an activated action object may be represented as one or more user interface controls appearing on the visualization. Accordingly, in some embodiments, an activated action object may appear in the form of a menu item, user interface buttons, highlighted/emphasized borders around their associated display objects, icons on toolbars, floating menus, floating buttons, images, arbitrary shapes, or the like, or combination thereof.

In one or more of the various embodiments, activated action objects, such as, action object 504B may be associated with one or more input signals, such as, input signals 508. In some embodiments, upon to occurrence or observation of one or more signals, the action object may execute one or more configured actions. In some embodiments, the particular signals or signal conditions may be selected or configured by the authoring user from a palette of signals made available by the modeling engine. In some embodiments, the available palette of signals may be modified depending on one or more features or actions of the action object. In some embodiments, input signal may include, button clicks (e.g., onClick events), menu selections, mouse button state, touchscreen input state, or the like. In some embodiments, signals may be inputs provided by other action objects or by the display engine. For example, one or more dependent action objects may be arranged to be signalled if a parent action object is signalled. Likewise, an action object may be arranged to be signalled based on the properties or activities associated with one or more display objects.

Also, in some embodiments, signal may include events or messages associated with the display hardware (e.g., client computer) that may be displaying the visualization based on the display model. For example, if the display hardware is a mobile device, a signal may include display orientation, application foreground/background state, or the like. In other embodiments, display signals may include events or messages associated with power management, or the like.

Accordingly, in one or more of the various embodiments, if the input signals provided to an action object meet the required conditions or values, one or more of the actions associated with an action object may be executed to modify the display model which may cause the currently displayed visualization to change.

In one or more of the various embodiments, the specific signals, signal values, or signal conditions, associated with an action object may be defined by the authoring user responsible for providing the display model. In some embodiments, one or more characteristics of an action object may influence or determine which signals may be available for a particular action object. For example, action objects associated with user interface buttons may support signals related to user interaction with a button.

Also, in one or more of the various embodiments, action objects may be associated with one or more constraints that define limitations to associate with the display or operation of an action object. In some embodiments, constraints may comprise one or more rules or conditions that limit how action objects may be displayed or applied in particular circumstance. For example, a constraint may be defined to limit the user roles that employ the action objects. Also, in some embodiments, constraints may also define minimum performance requirements of the display hardware. For example, if an action object is associated with an action that includes playing a video, a constraint may be defined to exclude the action object from being used when the display hardware does not support video. In some embodiments, other, constraints may be geometric or layout based. For example, a constraint may exclude displaying the action object in certain portions of a display screen.

FIG. 6 illustrates a logical schematic of system 600 that includes display models used for dynamic view management in visualizations in accordance with one or more of the various embodiments. In this example, display model 602 represents a display model as provided by an authoring user to a non-authoring user. Accordingly, in this example, display model 602 includes various display objects, such as, display object 604 and display object 606.

In this example, display model 608 represents display model 602 as it may be modified by one or more action objects associated with display objects included in display model 602. In this example, display object 604 may be associated with an action object that enables a non-authoring user to temporarily modify the display model by removing display object 604 and its progeny from display model 602 producing modified display model 608.

Figure 7:
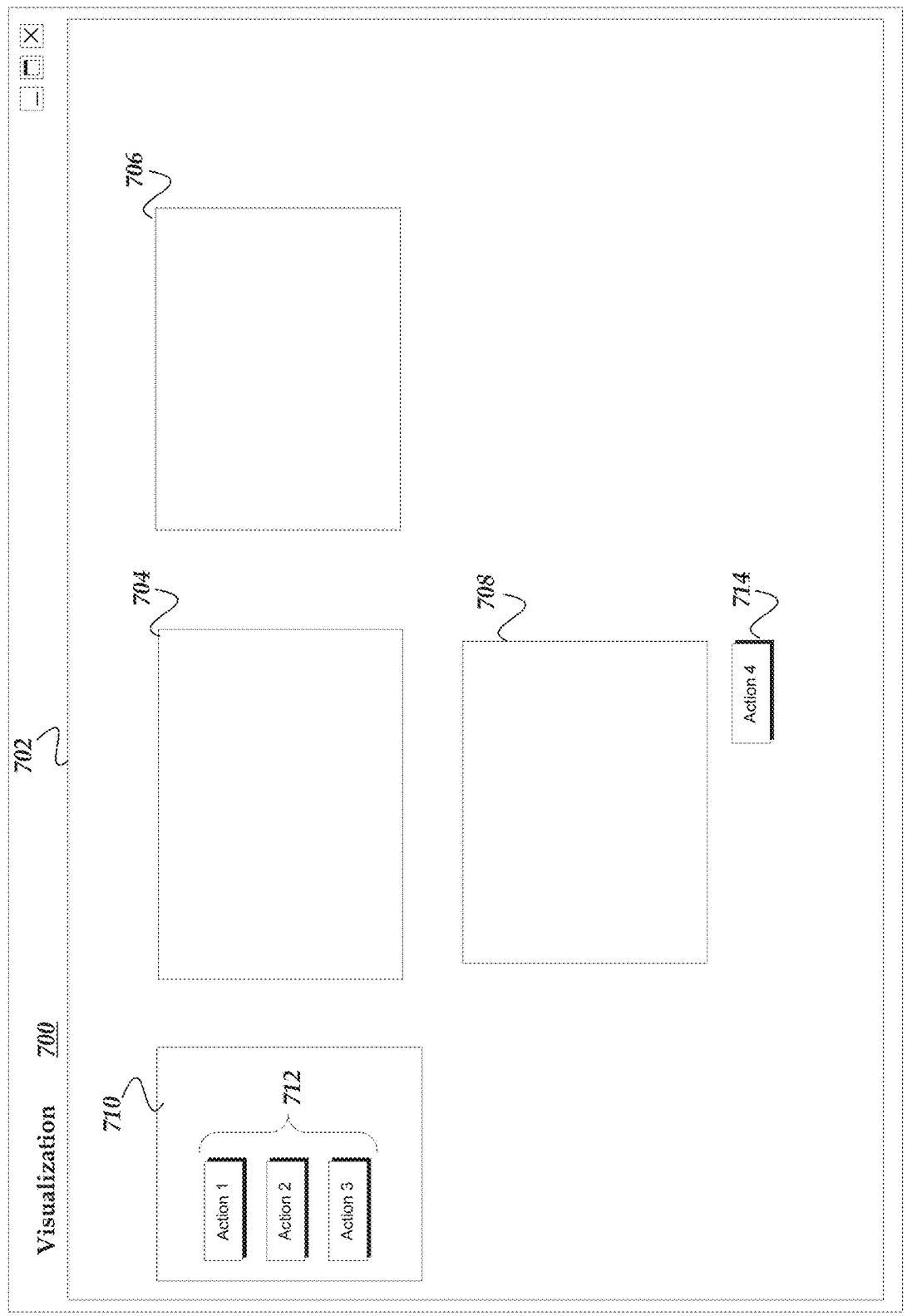
FIG. 7 illustrates a logical representation a display showing a common use case for dynamic view management in visualizations in accordance with one or more of the various embodiments.

FIG. 7 illustrates a logical representation display 700 showing a common use case for dynamic view management in visualizations in accordance with one or more of the various embodiments. In some embodiments, display models and display objects, may be displayed on hardware displays. In this example, display 700 may represent a hardware display for a client computer. In some embodiments, hardware displays, such as, display 700 may be arranged to display visualizations, such as, display model 702. Accordingly, in this example, for some embodiments, display model 702 and multiple display objects, such as, display object 704, display object 706, display 708, or the like, may be used to generate and display a visualization on display hardware. Further, in this example, display object 710 is included in display model 702 to contain action objects 712.

In one or more of the various embodiments, the selection, styling, placement, or the like, of display objects in display model 702 may be the result of design decisions of the authoring user. In some embodiments, a modeling engine may be arranged to automatically generate display models based on templates or other rules. For example, one or more common data sets may be encountered often enough that a modeling engine may be provided one or more default templates for laying out display models. Likewise, in some embodiments, such templating rules may be used to partially design a display model that is later customized, tuned, or tweaked by an authoring user.

In one or more of the various embodiments, display objects, such as, display object 704, display object 706, display object 708, or the like, may be arranged to display visualizations associated with one or more data objects from an underlying data model. In one or more of the various embodiments, display objects provide visualizations of data objects using line graphs, pie charts, bar graphs, scatter plots, heat maps, Sankey diagrams, histograms, time series graphs, candlestick charts, geolocation charts, or the like, or combination thereof. The particular visualization used for a display object may be selected by an authoring user or the modeling engine may be arranged to automatically select one or more visualizations based on templates, rules, configuration, or the like.

In one or more of the various embodiments, one or more action objects may be available in a given display model. In this example, it shows that the modeling engine or an authoring user has included four action objects in visualization. Note, in this example, action objects are shown in a toolbar object (e.g., display object 710). In other display models, the modeling engine or an authoring user may configure visualizations to present available action objects in different or various ways, including, pull down menu items, hidden (e.g., accessible by keystrokes rather than displayed), flyout menus, show-on-hover, or the like. For example, in some embodiments, an authoring tool employed by the authoring user may provide a palette of display options to use for action objects. Thus, for example, the authoring user may select how to present available action objects in a display model or visualization.

In one or more of the various embodiments, as described above, action objects associated with display objects and included in display models may be configured to be selectively used by a non-authoring user. Accordingly, in this example, action objects 712 included in display object 710 may be considered an example of action objects that are available for use by a non-authoring user. In contrast, in this example, action object 714 may be an action object that has been activated in response to one or more trigger events. In this example, assume that the non-authoring user has triggered action object 714 by dragging it from display object 710 to activate and associate it with display object 708. As mentioned, various triggering events may been associated with an action object. For example, in this example, the trigger events for action object 714 may include right-clicking on display object 708 rather than dragging it from display object 710.

In this example, for some embodiments, action object 714 has been activated by the non-authoring user providing the trigger events associated with the action object. In some embodiments, an authoring user may configure trigger events to include context information or one or more performance metrics to determine if an action object should be activated. For example, one or more action objects may be configured to automatically activate based on trigger events associated with considerations, such as, screen resolution, screen size, screen orientation, color range of display, user accessibility setting, or the like, or combination thereof.

For example, in some embodiments, a display model may be designed to automatically scale based on screen size. However, in some embodiments, the modeling engine or authoring user may associate an action object to key display objects that may be triggered if the display size falls below a threshold value. For example, the authoring user may determine that non-authoring users should be given the option to dynamically modify the display model by zooming into one or more important display objects rather than be forced to view the entire display model visualization on a small screen. In this example, one or more action objects may be arranged to be automatically triggered if the screen resolution fall below a defined threshold making them available to the user.

In one or more of the various embodiments, activated action objects, such as, action object 714, in this example, are now listening for one or more signals that indicate their actions should be executed. In this example, action object 714 is represent as a user interface button. Accordingly, in this example, if a non-authoring user interacts (e.g., presses or clicks) with the button, the one or more actions associated with action object 714 may be executed.

For example, in some embodiments, pressing the user interface for action object 714 may perform one or more pre-defined actions that modify the display model, such as, hiding, moving, or re-sizing display object 708.

In one or more of the various embodiments, a modeling engine may be arranged to enable trigger events, signals or signal conditions, actions, or the like, to be selected from a defined palette (e.g., from toolbars, menus, or the like) or determined using configuration information, rules, computer readable instructions, or the like. Further, in some embodiments, triggers or signals may incorporate input from one or more external services. For example, a trigger event may include determining if a user has a particular role, thus limiting an action object to certain roles. Accordingly, in some embodiments, during runtime, the display engine may be arranged to communicate with an external user directory service to determine or confirm the role of the user.

In one or more of the various embodiments, enabling the modeling engine or authoring users to include action objects in display models enable display models to be provided with dynamic view management that provides non-authoring users limited flexibility that is specifically granted to them by the modeling engine or authoring user.

In one or more of the various embodiments, the display engine may be arranged to collect or monitor one or more performance characteristics or one or more performance metrics of the display hardware, client computer, host operating system, or the like. Also, in one or more of the various embodiments, the display engine may be arranged to monitor other information, such as, a user information, environmental information (e.g., temperature, motion, location, or the like), or the like. Accordingly, the parameters representing additional information collected by the display engine may be provided for use in trigger event, signals, or actions, as context information.

Generalized Operations

Figure 8:
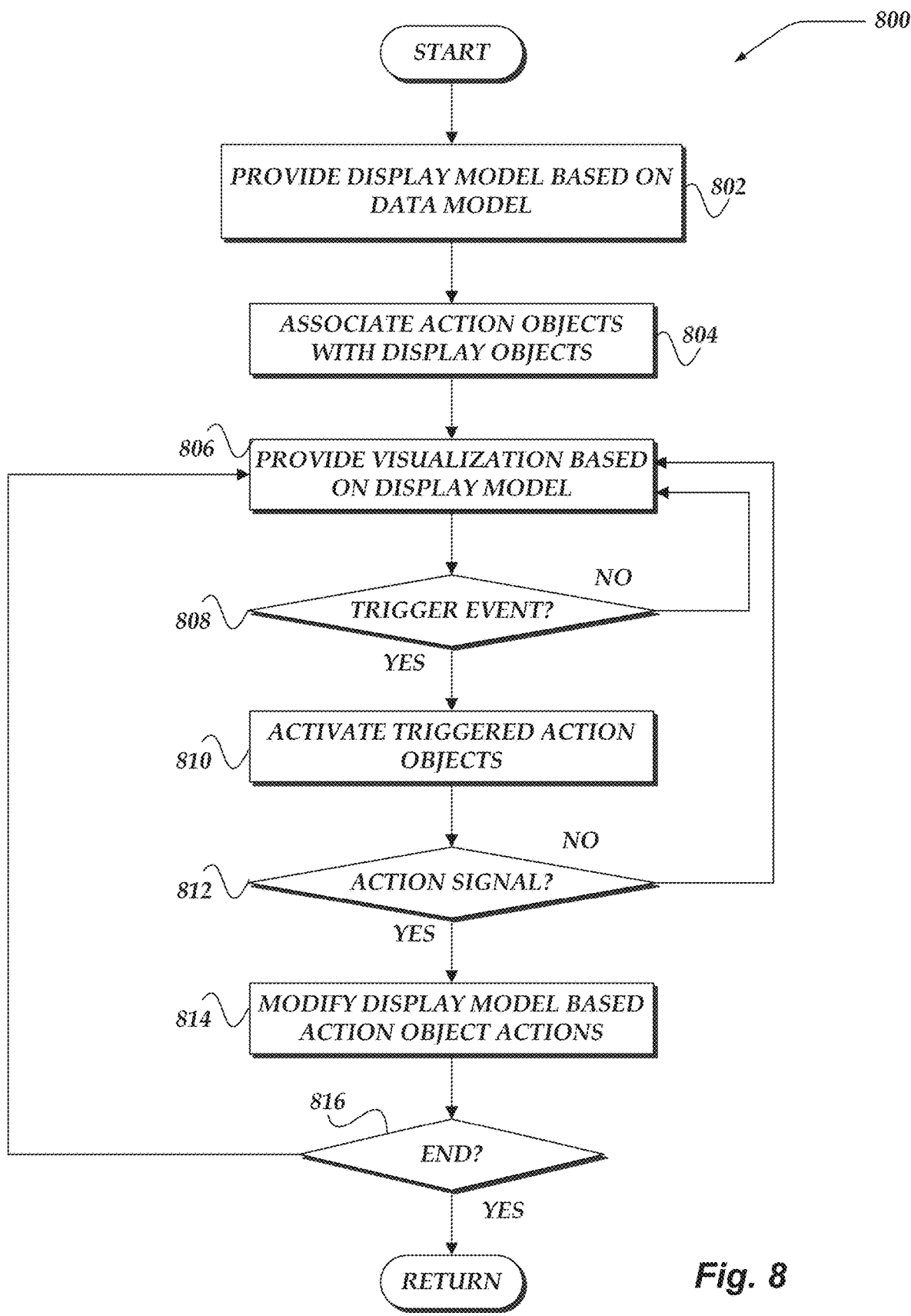
FIG. 8 illustrates an overview flowchart of a process for dynamic view management in visualizations in accordance with one or more of the various embodiments.
Figure 9:
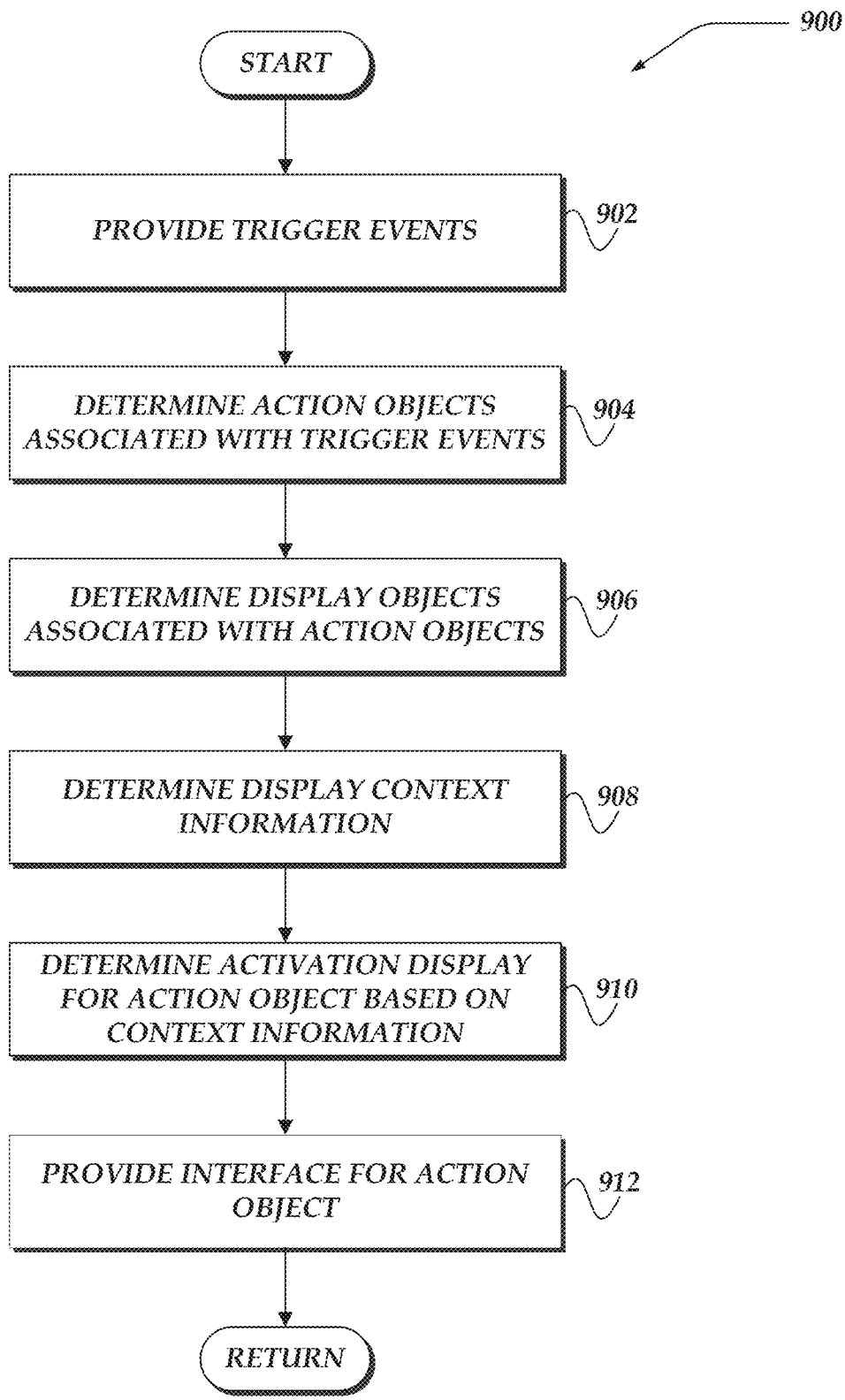
FIG. 9 illustrates a flowchart of a process for dynamic view management in visualizations in accordance with one or more of the various embodiments.
Figure 10:
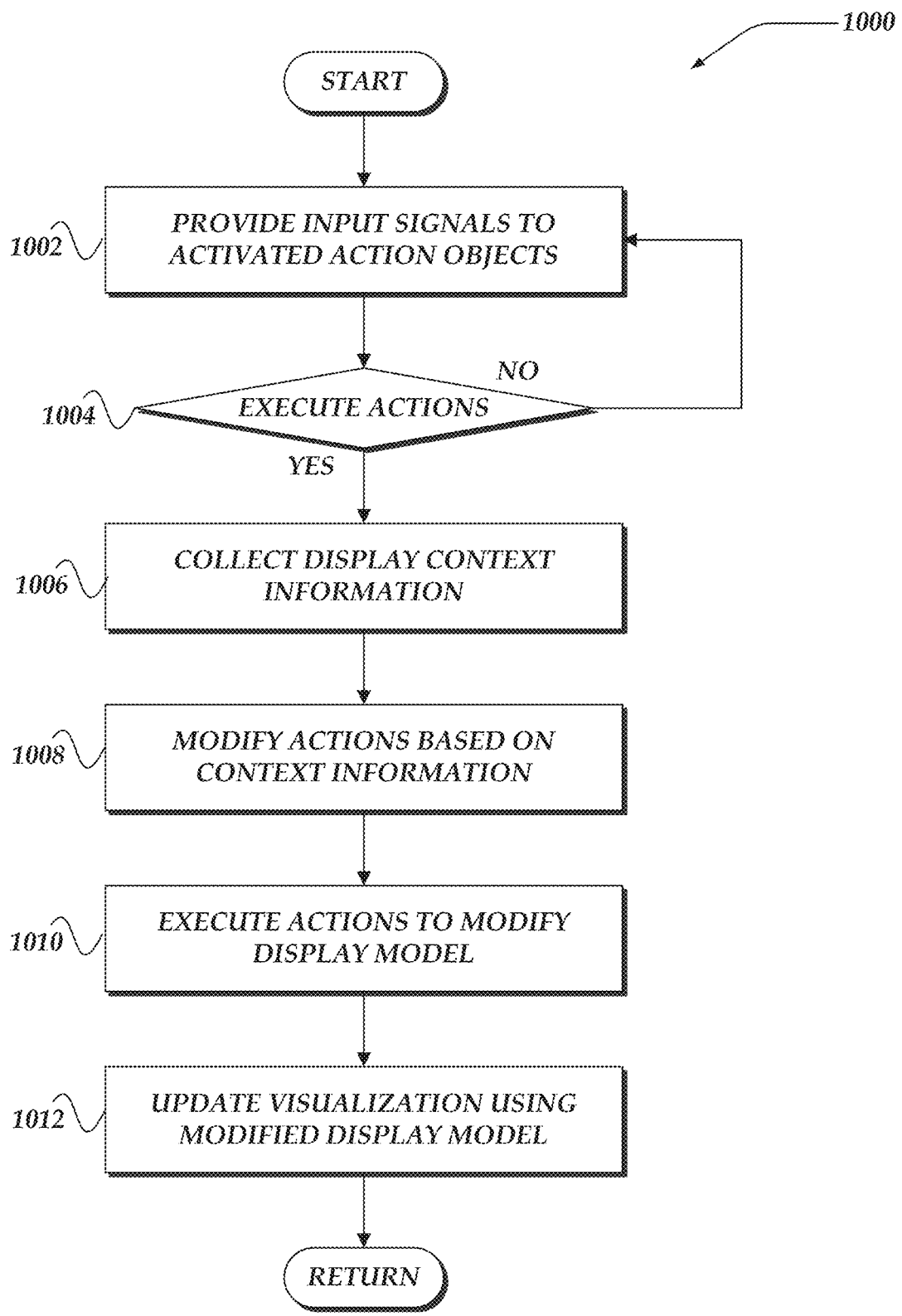
FIG. 10 illustrates a flowchart of a process for dynamic view management in visualizations in accordance with one or more of the various embodiments.

FIGS. 8-10 represent generalized operations for dynamic view management in visualizations in accordance with one or more of the various embodiments. In one or more of the various embodiments, processes 800, 900, and 1000 described in conjunction with FIGS. 8-10 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-10 may be used for dynamic view management in visualizations in accordance with at least one of the various embodiments or architectures such as those described in conjunction with FIGS. 4-7. Further, in one or more of the various embodiments, some or all of the actions performed by processes 800, 900, and 1000 may be executed in part by modeling engine 322 or display engine 324 running on one or more processors of one or more network computers.

FIG. 8 illustrates an overview flowchart of process 800 for dynamic view management in visualizations in accordance with one or more of the various embodiments. After a start block, at start block 802, in one or more of the various embodiments, a display model based on a data model may be provided. In some embodiments, modeling engines may be arranged to automatically generate display models from data models based on templates, rules, or the like. In other embodiments, the modeling engine may be arranged to provide an authoring tool to one or more authoring users for authoring display models. In some embodiments, display models may be represented using one or more standard graphic description languages or format. Accordingly, in some embodiments, some or all of the display model information may be provided by an external application or service.

At block 804, in one or more of the various embodiments, one or more action objects may be associated with one or more of the display objects included in the display model. In some embodiments, authoring users may select the action objects. In other embodiments, the modeling engine may be arranged to automatically associate one or more predefined action objects to one or more display objects based on configuration information, rules, user input, or the like. For example, the modeling engine may be arranged to automatically associate one or more action objects with display objects having one or more well-defined attributes.

At block 806, in one or more of the various embodiments, the display engine may employ the display model to produce or display a visualization on display hardware based on the display model. For example, in some embodiments, a non-authoring user may employ a client display engine to access a database (or list) of display models and select one to view one their display hardware.

At decision block 808, in one or more of the various embodiments, if one or more trigger events for one or more action objects occur, control may flow to block 810; otherwise, control may loop back to block 806. As described above, particular trigger events may be associated with a given action objects. Trigger events could be context based or user action based. Thus, actions performed by a user, such as, right-clicking on display objects, dragging buttons from a tool palette, or the like, may trigger events associated with one or more action objects.

At block 810, in one or more of the various embodiments, in response to the trigger events, one or more action objects may be activated. In some embodiments, this may include displaying or making available to the user a user interface control, or the like. Generally, in some embodiments, activating an action object makes it available for use by a non-authoring user.

At decision block 812, in one or more of the various embodiments, if one or more signals associated with one or more action objects occur, control may flow to block 814; otherwise, control may loop back to block 806. As described above, one or more signals or signal conditions may be associated with action objects. For example, a display engine may be arranged to monitor various input sources for relevant signals. Then as signals occur the display engine may determine if there are activated action objects configured to listen or respond to the signals and pass them along to the action object.

At block 814, in one or more of the various embodiments, the display engine may be arranged to modify the display model based on one or more actions associated with signaled action objects. For example, an action object that is associated with button may be signaled if a user clicks the button associated with the action object. Thus, the actions associated with the signaled action objects may be executed to modify the display model.

At decision block 816, in one or more of the various embodiments, if the visualization session has ended, control may be returned to a calling process; otherwise, control may be loop back to block 806.

FIG. 9 illustrates a flowchart of process 900 for dynamic view management in visualizations in accordance with one or more of the various embodiments. After a start block, at start block 902, in one or more of the various embodiments, one or more trigger events may be provided to a display engine. As described above, various trigger events may be associated with one or more action objects. In some embodiments, one or more trigger events may be automatically associated with one or more action objects. In other embodiments, one or more trigger events may be associated with one or more action objects by an authoring user that is designing a particular display model.

In one or more of the various embodiments, display engines may be provided one or more messages, events, or the like, the represent the occurrence of the trigger event. In some embodiments, trigger events, such as, mouse clicks, context information, display state information, or the like, make provided by a host operating system. In some embodiments, trigger events may be provided by other services, including external services.

At block 904, in one or more of the various embodiments, the display engine may determine one or more action objects that may be associated with the provided trigger events. In some embodiments, the display engine may be arranged to act as an intermediary the broker the trigger events. Accordingly, in some embodiments, the display engine may receive the trigger events and forward them to the relevant action objects for interpretation. In other embodiments, the display engine may be arranged to interpret the trigger events to determine the implicated action objects, if any.

At block 906, in one or more of the various embodiments, the display engine may be arranged to determine one or more display objects that may be associated with the determined action objects. In some embodiments, action objects may be associated with more than one display objects. In some embodiments, action objects may be associated with a class of display objects. In some embodiments, if multiple display objects are determined, the display engine may require input from users or rules to select from among two or more display objects. In some embodiments, all of the determined display object may be selected. In some embodiments, this determination may be made based on trigger information or other configuration information or rule that may be associated with the action objects.

At block 908, in one or more of the various embodiments, the display engine may be arranged to determine the context information associated with the display model and visualization. As described above, context information include display hardware characteristics or metrics, user characteristics, external information, environment information, operating system information, performance metrics, or the like. or combination thereof.

At block 910, in one or more of the various embodiments, the display engine may be arranged to determine how to display the activated action objects. In some embodiments, the display engine may be arranged to employ a common or default ruleset that interprets the context information to determine how to represent the activated action objects. In some embodiments, the display engine may be arranged to apply one or more action object specific rules or configuration information to determine the activation display. In some embodiments, one or more action objects may be associated with rules that select a different activation method or user interface depending on one or more values in the context information. For example, if the context information indicates that the display screen is low resolution, one or more default rules or action object specific rules may select a user interface control that is appropriate for lower resolutions. Likewise, for example, if the context information indicates that the display hardware is limited to touch input, the display engine may select a different activation display than it would select for display hardware that supports mouse and keyboard inputs.

At block 912, in one or more of the various embodiments, the display engine may be arranged to generate or display the activation interfaces for the activated action objects. As described above, authoring users may associate various activation interfaces with the action objects, such as, buttons, menu items, or the like. Accordingly, the display engine may be arranged to display (or otherwise make available to the user) the determined activation user interfaces.

In some embodiments, one or more action objects may be associated with a user visible activation interfaces while one or more other action objects may be associated with hidden interfaces, such as, key strokes, gestures, hotkeys, or the like.

Next, in some embodiments, control may be returned to a calling process.

FIG. 10 illustrates a flowchart of process 1000 for dynamic view management in visualizations in accordance with one or more of the various embodiments. After a start block, at start block 1002, in one or more of the various embodiments, one or more signals may be provided to the one or more activated action objects. In some embodiments, the display engine may be arranged to detect or determine one or more signals that may be provided to action objects for interpretation. In some embodiments, the display engine may be arranged to analyze the signals and determine the associated action objects, if any.

At decision block 1004, in one or more of the various embodiments, if one or more of the provided signals match the execution conditions for one or more action objects, control may flow to block 1006; otherwise, control may loop back to block 1004. In some embodiments, user interactions or system state/behavior may provide a steady stream of input signals. Some signals may be of interest because they may be associated with one or more activated action objects while other signals may be not of interest because they are not associated with activated action objects. Note, the display model may include one or more inactive or dormant action objects that a non-authoring user has elected not to use (or is disallowed from using). Signals associated with dormant action objects may be considered of no interest until those action objects are activated.

At block 1006, in one or more of the various embodiments, as described above, the display engine may be arranged to collect context information associated with the user, display hardware, or the like.

At block 1008, in one or more of the various embodiments, one or more actions associated with the action objects may be modified based on the context information. Alternatively, in some embodiments, action objects may be associated with more than one action and one or more rules that interpret the context information as part of selecting which actions to execute.

At block 1010, in one or more of the various embodiments, the display engine may be arranged to execute one or more actions associated with the signaled action objects. For example, an action object may be arranged to toggle the visibility of its associated display objects. Accordingly, in this example, if the action object is signaled, the display model may be modified by changing/toggling the visible state of the associated display objects.

At block 1012, in one or more of the various embodiments, the display engine may be arranged to update the visualization displayed on the display hardware based on the modified display model. Accordingly, in one or more of the various embodiments, the action objects enable non-authoring user to modify the display model within the confines or constraints provided by the authoring user.

Next, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for displaying visualizations using one or more processors that execute instructions to perform actions, comprising:
    employing a display model to associate one or more action objects with one or more display objects for the display model; and
    providing context information associated with a hardware display, wherein the context information is employed to display a visualization of the display model;
    in response to detecting a first type of action event associated with the one or more action objects, employing the context information to display each action object that corresponds to the detected first type of action event; and
    in response to detecting a second type of action event associated with the one or more action objects, performing further actions, including:
        modifying the display model based on the one or more action objects that correspond to the detected second type of action event and detection of a third type of action event; and
        employing the context information to display the visualization that includes the modified display model to improve a performance of the hardware display.

2. The method of claim 1, further comprising one or more data objects in a data model, wherein the one or more display objects are based on the one or more data objects.

3. The method of claim 1, wherein the context information further comprises one or more performance characteristics of the hardware display.

4. The method of claim 1, wherein the one or more action objects further comprise a trigger event, a signal, and a constraint, and wherein the first type of action event is the trigger event, the second type of action event is the signal, and the third type of action event is the constraint.

5. The method of claim 1, further comprising:
    providing one or more dependent action objects that are associated with the one or more action objects; and
    in response to detecting the second type of action event associated with the one or more action objects, modifying each display object that corresponds to the one or more action objects and the one or more dependent action objects.

6. The method of claim 1, wherein modifying the display model, includes:
    determining one or more static display characteristics of the one or more display objects, wherein the one or more static display characteristics include one or more of display geometry, visibility, text content, labels, or size; and
    modifying the one or more display objects based on the one or more static display characteristics.

7. The method of claim 1, wherein the modified display model further comprises one or more of:
    a new number of displayed pixels that supports a new display resolution;
    a new number of colors in a new display palette; or
    a new number of controls in a user interface that is accessible to a user.

8. A system for displaying visualizations over a network, comprising:
    a network computer, including:
        a memory that stores at least instructions; and
        one or more processors that execute instructions that perform actions, comprising:
            employing a display model to associate one or more action objects with one or more display objects for the display model; and
            providing context information associated with a hardware display for a client computer, wherein the context information is employed to display a visualization of the display model;
            in response to detecting a first type of action event associated with the one or more action objects, employing the context information to display each action object that corresponds to the detected first type of action event; and
            in response to detecting a second type of action event associated with the one or more action objects, performing further actions, including:
                modifying the display model based on the one or more action objects that correspond to the detected second type of action event and detection of a third type of action event; and
                employing the context information to display the visualization that includes the modified display model to improve a performance of the hardware display; and
    the client computer, comprising:
        the hardware display;
        a memory that stores at least instructions; and
        one or more processors that execute instructions that perform actions, including:
            displaying the visualization on the hardware display.

9. The system of claim 8, further comprising one or more data objects in a data model, wherein the one or more display objects are based on the one or more data objects.

10. The system of claim 8, wherein the context information further comprises one or more performance characteristics of the hardware display.

11. The system of claim 8, wherein the one or more action objects further comprise a trigger event, a signal, and a constraint, and wherein the first type of action event is the trigger event, the second type of action event is the signal, and the third type of action event is the constraint.

12. The system of claim 8, further comprising:
    providing one or more dependent action objects that are associated with the one or more action objects; and
    in response to detecting the second type of action event associated with the one or more action objects, modifying each display object that corresponds to the one or more action objects and the one or more dependent action objects.

13. The system of claim 8, wherein modifying the display model, includes:
    determining one or more static display characteristics of the one or more display objects, wherein the one or more static display characteristics include one or more of display geometry, visibility, text content, labels, or size; and
    modifying the one or more display objects based on the one or more static display characteristics.

14. The system of claim 8, wherein the modified display model further comprises one or more of:
    a new number of displayed pixels that supports a new display resolution;
    a new number of colors in a new display palette; or
    a new number of controls in a user interface that is accessible to a user.

15. A processor readable non-transitory storage media that includes instructions for displaying visualizations over a network, wherein execution of the instructions by one or more processors on one or more network computers performs actions, comprising:
    employing a display model to associate one or more action objects with one or more display objects for the display model; and
    providing context information associated with a hardware display, wherein the context information is employed to display a visualization of the display model;
    in response to detecting a first type of action event associated with the one or more action objects, employing the context information to display each action object that corresponds to the detected first type of action event; and
    in response to detecting a second type of action event associated with the one or more action objects, performing further actions, including:
        modifying the display model based on the one or more action objects that correspond to the detected second type of action event and detection of a third type of action event; and
        employing the context information to display the visualization that includes the modified display model to improve a performance of the hardware display.

16. The processor readable non-transitory storage media of claim 15, wherein execution of the instructions by the one or more processors on the one or more network computers performs further actions, comprising:
    providing one or more data objects in a data model, wherein the one or more display objects are based on the one or more data objects.

17. The processor readable non-transitory storage media of claim 15, wherein execution of the instructions by the one or more processors on the one or more network computers performs further actions, comprising:
    providing one or more performance characteristics of the hardware display as at least a portion of the context information.

18. The processor readable non-transitory storage media of claim 15, wherein execution of the instructions by the one or more processors on the one or more network computers performs further actions, comprising:
    providing a trigger event as the first type of action event, a signal as the second type of action event, and a constraint as the third type of action event.

19. The processor readable non-transitory storage media of claim 15, wherein execution of the instructions by the one or more processors on the one or more network computers performs further actions, comprising:
    providing one or more dependent action objects that are associated with the one or more action objects; and
    in response to detecting the second type of action event associated with the one or more action objects, modifying each display object that corresponds to the one or more action objects and the one or more dependent action objects.

20. The processor readable non-transitory storage media of claim 15, wherein execution of the instructions by the one or more processors on the one or more network computers performs further actions, comprising:
    determining one or more static display characteristics of the one or more display objects, wherein the one or more static display characteristics include one or more of display geometry, visibility, text content, labels, or size; and
    modifying the one or more display objects based on the one or more static display characteristics.

* * * * *